Jan. 28, 1969 C. LENZ 3,424,878
CONTROL MECHANISM
Filed Oct. 26, 1965
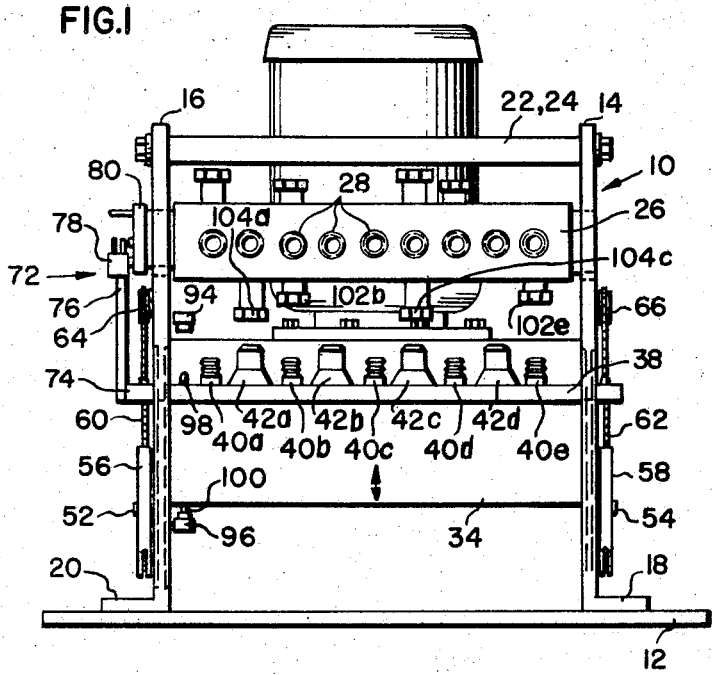
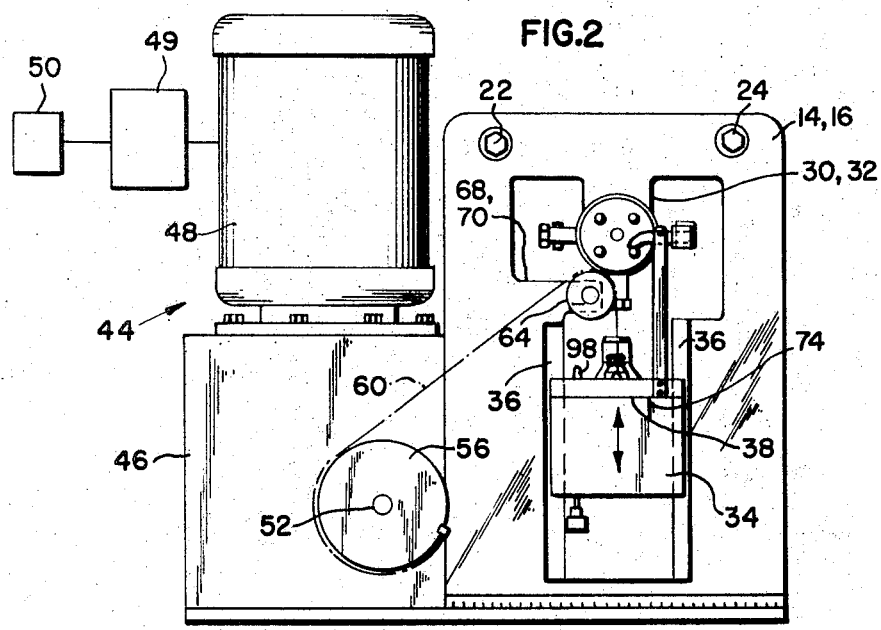
INVENTOR.
CONRAD LENZ
BY Low and Berman
AGENTS

United States Patent Office 3,424,878
Patented Jan. 28, 1969

3,424,878
CONTROL MECHANISM
Conrad Lenz, Annenhofstrasse 2, Freising, Germany
Filed Oct. 26, 1965, Ser. No. 513,612
U.S. Cl. 200—46      9 Claims
Int. Cl. H01h 43/18

ABSTRACT OF THE DISCLOSURE

A control mechanism for automatically operating brewery equipment has a control rod rotatable on a support about a fixed axis and a carrier slidable on the support toward and away from the rod. Switches and hydraulic pressure transmitters on the carrier generate control signals for the brewery equipment when engaged by abutment studs mounted on the rod in angularly offset rows. The carrier is reciprocated on the support by a motor controlled by limit switches in the path of the carrier, and the control rod is indexed by a ratchet mechanism including a pawl mounted on the carrier.

---

Figure 3:
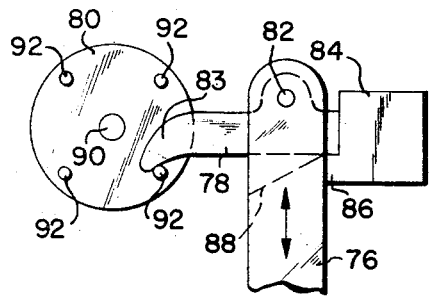

This invention relates to a control mechanism, and particularly to a control mechanism which generates control signals in adjustable timed sequence.

The invention is more specifically concerned with the automation of brewery operations, and will be described hereinafter in its application to brewery equipment, but it will be understood that the invention is not limited to the specific equipment or operation that is to be controlled.

A primary object of the invention is the provision of a control mechanism which is sturdy and simple so as to operate reliably under the relatively severe mechanical and chemical stresses to which it may be subjected in a brewery.

Another object is the provision of a control mechanism which operates with great precision, and which maintains its precision without requiring more than minimal care and maintenance.

A further object is the provision of a control mechanism which is versatile enough for changes in procedure and timing in a simple manner, the necessary adjustments being capable of being made by unskilled or semiskilled operators.

These objects and others, which will become apparent as the disclosure proceeds, are achieved in a mechanism in which a control member and a carrier member are movably mounted on a housing. One of these two members has a face directed toward the other member, and the latter has several faces which are alignable with the face of the first-mentioned member by movement of the other member. First drive means move the one member on the housing in a predetermined vertically extending direction between an inoperative position remote from the other member, and an operative position adjacent the other member and include an elongated, flexible tension member whose terminal portions are respectively fastened to the one member and to a pulley which is rotatably mounted on the housing in such a manner that the tension member is wound on the pulley when the latter rotates in one direction, and is unwound during rotation of the pulley in the other direction. A portion of the tension member intermediate the terminal portions extends upward from the one member and moves upward when the tension member is being wound on the pulley.

Second drive means are provided for moving the other one of the two members about an axis on the housing between respective positions in which its several faces are oppositely directed toward the single face of the one member in the direction of movement of the latter. A plurality of signal generators operable to generate a signal in response to being abuttingly engaged, and a plurality of abutment members are mounted on respective portions of the afore-mentioned faces in such a manner that a signal is generated by abutting engagement of a signal generator on one of the oppositely directed faces by an abutment member on the other oppositely directed face during movement of the one member from the inoperative to the operative position. Actuating means are provided for operating the first and second drive means in timed sequence.

Figure 4:
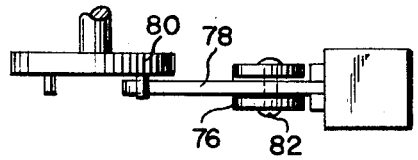
Figure 5:
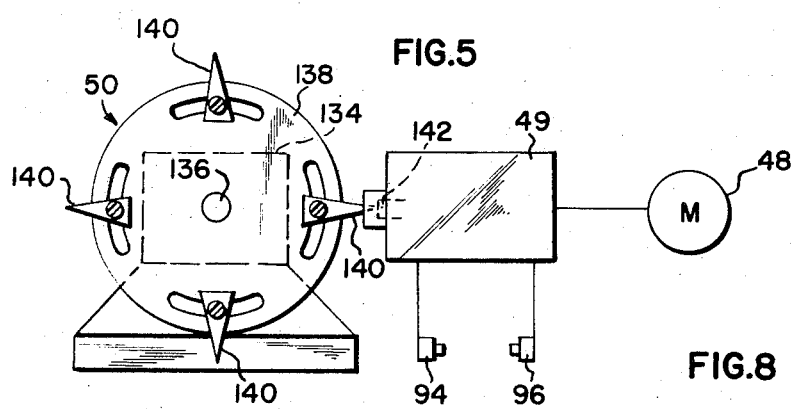
Figure 8:
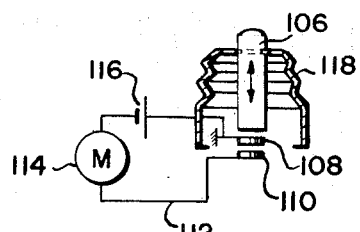
Figure 7:
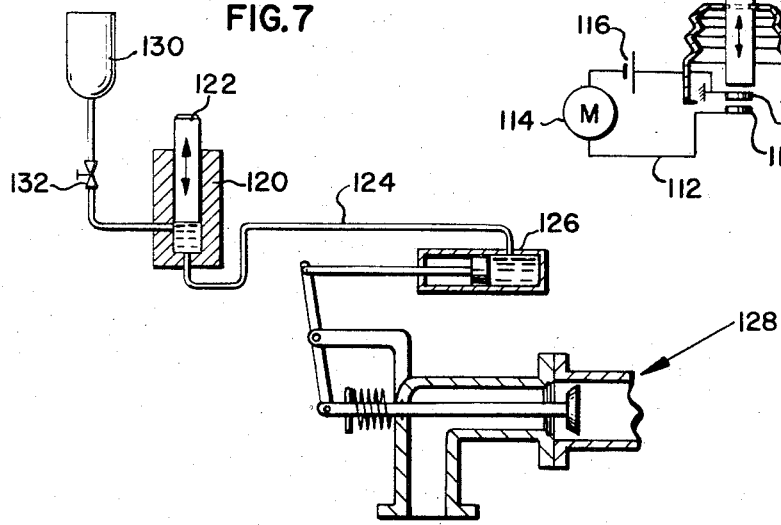
Figure 6:
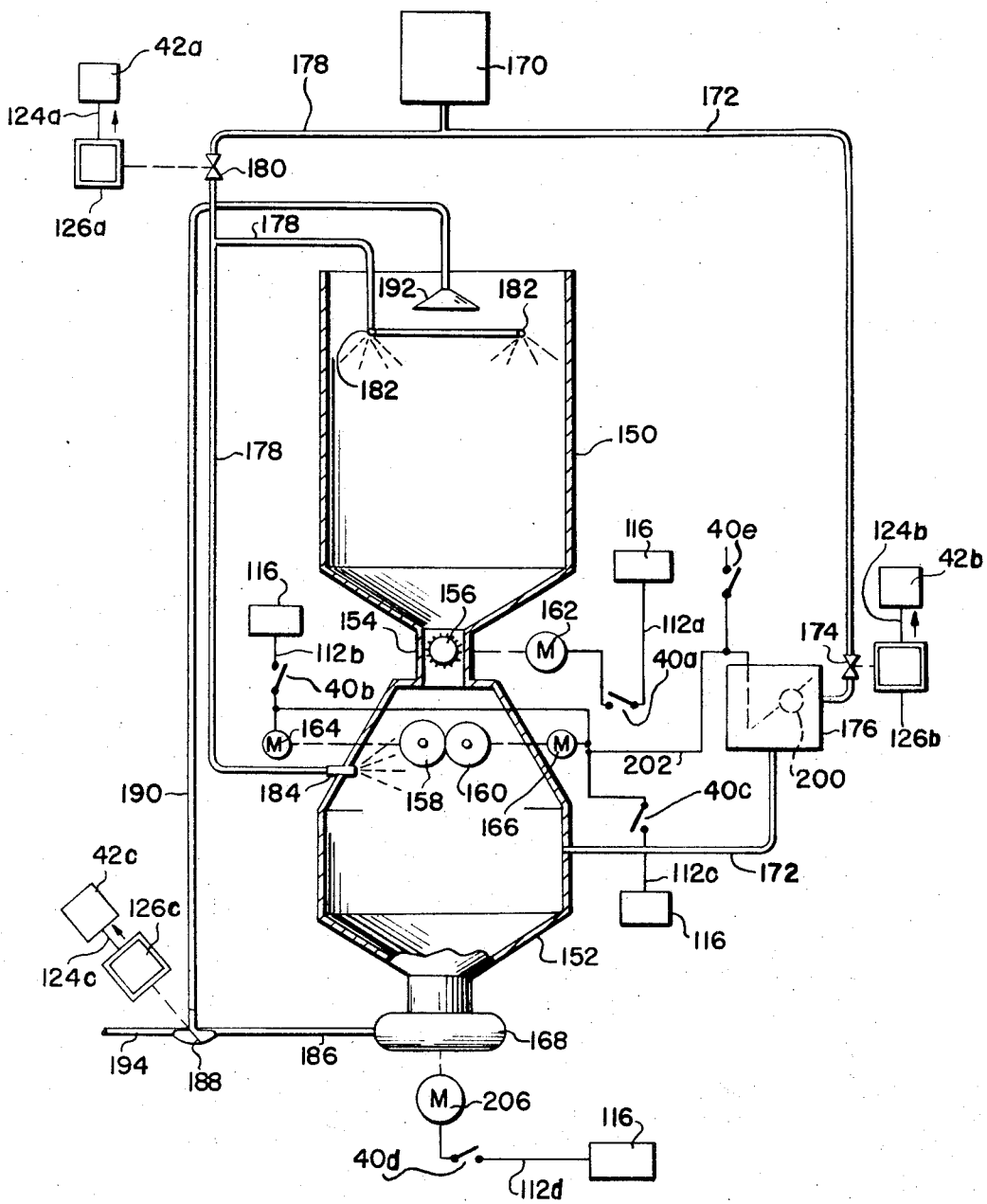

Other features and many of the attendant advantages of this invention will be readily appreciated as the same becomes better understood by reference to the following detailed description of a preferred embodiment when considered in connection with the accompanying drawing in which:

FIG. 1 shows a control mechanism of this invention in front elevation;
FIG. 2 shows the control mechanism of FIG. 1 in side elevation;
FIG. 3 shows a detail of FIG. 2 on a larger scale;
FIG. 4 is a plan view of the device of FIG. 3;
FIG. 5 shows another detail of FIG. 2 in elevation on a larger scale;
FIG. 6 shows a mashing unit of a brewery plant controlled by the control mechanism of this invention, the view being partly in elevation and partly schematic;
FIG. 7 shows a pressure transmitter of the control mechanism of FIGS. 1 and 2 and a hydraulically operated valve of the mashing device of FIG. 6 operated by said hydraulic transmitter; and
FIG. 8 shows an electric switch of the control mechanism of FIG. 1.

In FIG. 1, a supporting housing consists of a base plate 12 and two side plates 14 and 16 fixed by flanges 18 and 20 respectively to the base plate. Tie rods 22 and 24 connect the tops of the two side plates 14 and 16. A control rod 26 having four flat faces is rotatably mounted in downwardly extending lugs 30, 32 of the side plates 14, 16, respectively.

Below the rod 26, a carrier bar 34 is vertically guided on the side plates 14 and 16 by rails 36. At the upper face of the carrier bar 34, a platform 38 bears electrical switches 40a, 40b, 40c, 40d, and 40e, generically referred to hereinafter by the numeral 40, and hydraulic pressure transmitters 42a, 42b, 42c, and 42d, generically referred to hereinafter by the numeral 42. The distances between the several electrical switches 40 and the several pressure transmitters 42 are equal to the distances between the openings 28 in the rod 26. The switches and pressure transmitters may be aligned with the openings 28 by turning the rod 26.

A motor unit 44 is mounted on the base plate 12 and comprises a gear transmission 46 and a reversible electric motor 48. A timing device 50 is connected to the motor 48 by a control unit 49. The transmission 46 is provided with two output shafts 52 and 54 carrying sprockets 56 and 58 respectively. Chains 60 and 62 are attached to the bar 34 and respectively trained over the sprockets 56 and 58 and over idling pulleys 64 and 66 rotatably mounted in lugs 68 and 70 of the side plates 14 and 16.

The rod 26 is turned by an indexing mechanism 72 mounted on a side arm 74 fixed to the platform 38 and including a push rod 76 carrying at its upper end a pawl 78 which cooperates with a ratchet wheel 80 on the control rod 26 in the manner of a one-way coupling.

As can be seen from FIGS. 3 and 4, the upper end of the push rod 76 is bifurcated. The pawl 78 is mounted by a pivot pin 82 between the bifurcated ends of the push rod 76 and is provided at one end with a hook 83 and at its other end with a counterweight 84. The counterweight 84 presses with a projection 86 against the push rod 76 in the rest position of pawl 78. The pawl 78 can be pivoted counterclockwise as seen in FIG. 3 until it rests against the bottom 88 of the bifurcation on the push rod 76.

The ratchet wheel 80 is mounted on a shaft 90 which extends axially from the rod 26. Four axially projecting ratchet pins 92 are uniformly distributed over the periphery of the wheel 80 for engagement with the hook 83 of the pawl 78. When the push rod 76 moves upwardly, as shown in FIG. 3, the hook 83 passes the right upper ratchet pin 92 while the pawl 78 is pivoted counterclockwise against the counterweight 84. The bearing friction of the rod 26 and the wheel 80 is sufficient to prevent rotation of the indexing wheel 80. When the push rod 76 moves downwards after its upward stroke, the hook 83 engages the ratchet pin 92 which is in the right upper position as shown in FIG. 3, whereby the wheel 80 is turned 90°.

Upper and lower limit switches 94 and 96 respectively are engaged by pins 98, 100 on the bar 34 in the uppermost and lowermost positions of the bar 34 respectively. The limit switches 94 and 96 form part of the motor control unit 49.

Abutment studs 102b and 102e and 104a and 104c, hereinafter jointly referred to by numerals 102, 104, are threadedly mounted in corresponding openings 28 of the rod 26. The lengths of these studs are such that they engage respective switches 40 and pressure transmitters 42 when the bar 34 is in its uppermost engagement position. In the lowermost position of the bar 34, the switches and pressure transmitters are so far from the associated studs that the rod 26 can be rotated freely.

A switch 40 is shown in more detail in FIG. 8. It has an actuating pin 106 acting on a movable contact 108, which when engaging a fixed contact 110, closes an electric circuit 112 with a motor generically referred to by the numeral 114 and a current source 116. Elastic bellows 118 surround the pin 106 and bias it toward a position in which the contacts 108, 110 are open.

A pressure transmitter 42 is shown by way of example in FIG. 7. It comprises a hydraulic cylinder 120 equipped with a plunger 122. A free end of the plunger 122 can be engaged by one of the studs 102, 104. From the hydraulic cylinder 120, a duct 124 leads hydraulic fluid to a hydraulic ram. A line 128 connects the cylinder 120 to a hydraulic fluid supply 130 and is normally closed by a valve 132.

The timing device 50 comprises a gear motor 134 whose output shaft 136 is rotated at constant velocity and carries a disk 138 equipped with four circumferentially adjustable riders 140. When the motor 134 operates, the riders 140 engage a push button 142 of the motor control unit 49 which starts the motor 48.

The control mechanism so for described operates as follows: When the pin 100 engages the limit switch 96 as seen in FIG. 1, the motor 48 causes the chains 60, 62 to be wound on the sprockets 56, 58, which are rotated counterclockwise as shown in FIG. 2, whereby the bar 34 is drawn upwards until the pin 98 engages the limit switch 94. At this moment the motor control unit 49 stops the motor 48, and the bar 34 remains in its engaged position in which the switches 40b and 40e and the pressure transmitters 42a and 42c are actuated by corresponding studs, whereby the contacts 108, 110 are shut and the motor 114 is energized. The piston 122 is pressed downwards, and hydraulic fluid is pushed to the ram 126.

The above described condition of the control mechanism ends when the next rider 140 of the disk 138 engages the push button 142.

When the push button 142 is pressed, the motor control unit 49 starts the motor 48 and keeps it energized when the push button returns to its original position. The motor 48 now turns clockwise as seen in FIG. 2, so that the chains 60 and 62 are unwound and the bar 34 runs downwards due to gravity. When the studs 102, 104 no longer interfere with the rotation of the rod 26, the pawl 78 engages a ratchet pin 92 and the wheel 80 is indexed. The pin 100 engages the lower limit switch 96, whereby the motor 48 is reversed. The bar 34 moves upwards again until it is stopped by the upper limit switch 94. This condition of the control device is changed only when the next rider 140 reaches the push button 142, so as to start a new cycle of operations. In accordance with the lengths of the studs 102, 104, different combinations of signals are given by the switches 40 and the pressure transmitters 42 in the several angular positions of the rod 26.

FIG. 6 shows, by way of example, a mashing device for a brewery controlled by the mechanism according to FIGS. 1–5 and 7–8. The mashing device comprises a malt storage container 150 connected with a mash chamber 152 by a downward channel 154 in which a rotary feeder 156 is driven by a motor 162. The mash chamber 152 contains crushing cylinders 158 and 160 driven by motors 164, 166. At the outlet of the mash chamber 152, a pump 168 is provided.

Mashing water is fed from a source 170 by a line 172 through a valve 174 and an intermediate container 176 to the mash chamber 152 by a line 178, and a valve 180 to nozzles 182 in the malt storage container, and to nozzles 184 in the mash chamber. An output line 186 leads from the pump 168 to a three-way valve 188 connected by a recycling line 190 to an inlet 192 in the malt storage container, whereas a line 194 leads to a nonillustrated mash copper.

The normally shut valve 180 is opened by a ram 126a connected by a line 124a to the pressure transmitter 42a. The normally shut valve 174 is opened by a ram 126b connected by a line 124b to the pressure transmitter 42b. The three-way valve 188 normally closes the line 194 to the mash copper and opens the recycling line 190. It is operated by a ram 126c connected by a line 124c to the pressure transmitter 42c.

The motor 162 is energized by the switch 40a connected by a line 112a to the current source 116. The motor 164 is energized by the switch 40b connected by a line 112b to the current source 116. The motor 166 is energized by the switch 40c connected by a line 112c to the current source 116.

A float-switch 200 in the intermediate container 176 de-energizes the motors 164 and 166 when the water level in the container 176 falls below a predetermined minimum.

The switch 40e permits the float-switch 200 to be shunted. The pump 168 is driven by a motor 206 energized through the switch 40d which is connected by a line 112d to the current source 116.

The apparatus of FIG. 6 operates in four consecutive stages corresponding to the four faces of the rod 26.

(A) SOAKING THE MALT

Water is fed through the nozzles 182 to malt in the storage container 150, flows through the mash chamber 152, and is recycled by the pump 168 through the line 190 and the valve 188. At the same time water is discharged into the chamber 152 through cleaning nozzles 184, the pump 168 is driven, and the recycling line 190 is closed.

(B) REMOVAL OF SOAKING WATER

The excess soaking water is pumped by the pump 168 through lines 186 and 194 to the mash copper.

(C) MASHING

The soaked malt is admitted by the feeder 156 to the crushing cylinders 158 and 160, the crushed material is mixed with water fed through line 172, and the mixture is conveyed by the pump 168 through lines 186 and 194 to the mash copper.

(D) CLEANING

Water is sprayed on the crushing cylinders 158 and 160, and the cleaning water is pumped to the mash copper together with water fed into the mash chamber 152 through the line 172.

What is claimed is:
1. A control mechanism comprising, in combination:
(a) a support;
(b) a control member and a carrier member movably mounted on said support, one of said members having a face directed toward the other member, and the other member having a plurality of faces respectively oppositely alignable with the face of said one member by movement of said other member;
(c) first drive means operable for moving said one member on said support in a predetermined vertically extending direction between an inoperative position remote from said other member and an operative position adjacent said other member, said first drive means including,
   (1) a flexible, elongated tension member having two terminal portions, one terminal portion being fastened to said one member,
   (2) a wheel member rotatably mounted on said support, the other terminal portion of said tension member being fastened to said wheel member for winding of the tension member on the wheel member when the same rotates in one direction, and for unwinding of the tension member when the wheel member rotates in the other direction,
   (3) a portion of said tension member intermediate said terminal portions extending upward from said one terminal portion and moving upward when said wheel member rotates in said one direction;
(d) second drive means mounted on said support and operatively connected to said other member, said second drive means being operable for moving said other member about an axis on said support between respective positions in which said faces thereof are oppositely directed toward the face of said one member in said predetermined direction;
(e) a plurality of control means each operable in response to abutting engagement thereof, and a plurality of abutment members, said control means and said abutment members being mounted on respective portions of said faces of the control and carrier members for operation when one of said control means on one of the two oppositely directed faces is abuttingly engaged by an abutment member on the other oppositely directed face during movement of said one member from said inoperative to said operative position; and
(f) actuating means for operating said first and second drive means in timed sequence.

2. A mechanism as set forth in claim 1, wherein said one member is said carrier member, said plurality of control means being mounted on said face of the carrier member, said other member being said control member, and said abutment members being mounted in respective axial rows on said faces of the control member.

3. A mechanism as set forth in claim 2, wherein said actuating means include a reversible electric motor, motor control means for controlling the starting, stopping, and direction of rotation of said motor, and timing means for operating said motor control means.

4. A mechanism as set forth in claim 3, wherein said timing means include means for generating pulses at predetermined intervals, and said motor control means include means responsive to each pulse for causing movement of said carrier member from said operative position to said inoperative position and thence to said operative position thereof.

5. A mechanism as set forth in claim 4, wherein said motor control means include limit switch means responsive to movement of said carrier member into said inoperative position for reversing the direction of rotation of said motor, and responsive to movement of said carrier member into said operative position for stopping said motor.

6. A mechanism as set forth in claim 5, wherein said second drive means include one-way coupling means interposed between said members for indexing said control member between angularly adjacent ones of said positions thereof in response to movement of said carrier member between said operative position and said inoperative position.

7. A mechanism as set forth in claim 6, wherein said coupling means include a ratchet member mounted on said control member for rotation therewith, a pawl member mounted on said carrier member for movement therewith in said direction, and means engaging said pawl and ratchet members for joint movement when said carrier member moves from the operative toward the inoperative position only.

8. A mechanism as set forth in claim 2, wherein said second drive means include indexing means responsive to movement of said carrier member from said operative position toward said inoperative position for angularly moving said control member about said axis.

9. A mechanism as set forth in claim 8, wherein said indexing means include a ratchet wheel mounted on said control member, a pawl mounted on said carrier member for movement therewith in said direction, and for pivoting movement relative thereto, said ratchet wheel engaging said pawl when moving between said positions and tending to pivot the same in one direction when said carrier member moves toward said inoperative position, and to pivot the pawl in the opposite direction when the carrier member moves toward the operative position, and abutment means on said carrier member limiting pivoting movement of said pawl in said one direction in such a manner that the pawl rotates the ratchet wheel.

References Cited
UNITED STATES PATENTS

| | | | |
|---|---|---|---|
| 2,987,591 | 6/1961 | Ortenblad | 200—61.41 |
| 3,155,782 | 11/1964 | Wilson | 200—11 |
| 3,194,888 | 7/1965 | Bach | 200—46 X |

ORIS L. RADER, *Primary Examiner.*

K. L. CROSSON, *Assistant Examiner.*